United States Patent
Park et al.

(10) Patent No.: US 11,968,671 B2
(45) Date of Patent: Apr. 23, 2024

(54) METHOD AND DEVICE FOR TRANSMITTING UPLINK DATA CHANNEL

(71) Applicant: KT CORPORATION, Gyeonggi-do (KR)

(72) Inventors: Kyujin Park, Seoul (KR); Ki-tae Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/043,429

(22) PCT Filed: Mar. 29, 2019

(86) PCT No.: PCT/KR2019/003707
§ 371 (c)(1),
(2) Date: Sep. 29, 2020

(87) PCT Pub. No.: WO2019/190264
PCT Pub. Date: Oct. 3, 2019

(65) Prior Publication Data
US 2021/0022132 A1   Jan. 21, 2021

(30) Foreign Application Priority Data

Mar. 30, 2018 (KR) .................. 10-2018-0037387
Mar. 28, 2019 (KR) .................. 10-2019-0035586

(51) Int. Cl.
*H04W 72/21* (2023.01)
*H04W 72/044* (2023.01)
*H04W 72/56* (2023.01)

(52) U.S. Cl.
CPC ....... *H04W 72/21* (2023.01); *H04W 72/0473* (2013.01); *H04W 72/56* (2023.01)

(58) Field of Classification Search
None
See application file for complete search history.

(56) References Cited

U.S. PATENT DOCUMENTS

2013/0215811 A1* 8/2013 Takaoka .............. H04W 52/367
                                                                  370/311
2013/0279435 A1 10/2013 Dinan
(Continued)

OTHER PUBLICATIONS

Samsung, "Multiplexing of UL Transmissions with Different Reliability Requirements", R1-1802002, 3GPP TSG RAN WG1 Meeting #92, Athens, Greece, Feb. 26-Mar. 2, 2018, pp. 1-7.
(Continued)

*Primary Examiner* — Kodzovi Acolatse
(74) *Attorney, Agent, or Firm* — INVENSTONE PATENT, LLC

(57) ABSTRACT

Provided are methods and apparatus for transmitting an uplink data channel in a next-generation/5G radio access network. The method of a UE may include receiving first resource assignment information on a first UL data channel and second assignment information on a second UL data channel from a base station, and preferentially assigning transmission power to one of the first and second UL data channels and adjusting the transmission power for the other when the first and second UL data channels are need to e transmitted by at least partially overlapping with each other in a time domain based on the first and second resource assignment information.

17 Claims, 17 Drawing Sheets

(56) References Cited

U.S. PATENT DOCUMENTS

| | | | |
|---|---|---|---|
| 2014/0369324 A1* | 12/2014 | Lin | H04W 56/0005 |
| | | | 370/336 |
| 2014/0376471 A1* | 12/2014 | Nishio | H04W 52/367 |
| | | | 370/329 |
| 2016/0295522 A1* | 10/2016 | Qin | H04W 52/28 |
| 2018/0287757 A1* | 10/2018 | Onggosanusi | H04L 5/0053 |
| 2019/0149269 A1* | 5/2019 | Chatterjee | H04L 5/0053 |
| | | | 370/329 |
| 2019/0149365 A1* | 5/2019 | Chatterjee | H04L 5/0044 |
| | | | 370/329 |
| 2019/0150183 A1* | 5/2019 | Aiba | H04W 48/12 |
| | | | 370/336 |
| 2019/0174466 A1* | 6/2019 | Zhang | H04L 5/0048 |
| 2019/0327755 A1* | 10/2019 | Xiong | H04L 1/1887 |
| 2020/0196302 A1* | 6/2020 | Takeda | H04L 5/0053 |
| 2020/0296673 A1* | 9/2020 | Ouchi | H04W 52/281 |
| 2021/0021385 A1* | 1/2021 | Chen | H04W 72/14 |

OTHER PUBLICATIONS

Mediatek Inc., "On UL multiplexing of transmissions with different reliability targets", R1-1801674, 3GPP TSG RAN1 WG1 Meeting #92, Athens, Greece, Feb. 26-Mar. 2, 2018.

LG Electronics, "Discussion on multiplexing UL transmission with different requirements", R1-1802228, 3GPP TSG RAN WG1 Meeting #92, Athens, Greece, Feb. 26-Mar. 2, 2018.

Huawei et al., "Discussion on partially overlapped PUCCH and PUSCH", R1-1801788, 3GPP TSG RAN WG1 Meeting #92, Athens, Greece, Feb. 26-Mar. 2, 2018.

* cited by examiner

METHOD AND DEVICE FOR TRANSMITTING UPLINK DATA CHANNEL

CROSS REFERENCE TO RELATED APPLICATIONS

This application is a National Stage Patent Application of PCT International Patent Application No. PCT/KR2019/003707 (filed on Mar. 29, 2019) under 35 U.S.C. § 371, which claims priority to Korean Patent Application Nos. 10-2018-0037387 (filed on Mar. 30, 2018), and 10-2019-0035586 (filed on Mar. 28, 2019), the teachings of which are incorporated herein in their entireties by reference.

TECHNICAL FIELD

The present disclosure relates to methods and apparatuses for transmitting an uplink data channel in a next-generation/5G radio access network (hereinafter, referred to as "NR (New Radio)").

BACKGROUND ART

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from each other (e.g., subcarrier spacing, subframe, Transmission Time Interval (TTI), etc.) as a method for efficiently satisfying each usage scenario requirement through a frequency band constituting any NR system.

DETAILED DESCRIPTION OF THE INVENTION

Technical Problem

It is at least one object of the present disclosure to provide methods and apparatuses for efficiently transmitting uplink ("UL") data channels in various situations in which a plurality of UL data channel transmissions simultaneously occurs in one UE in the NR.

Technical Solution

To address such issues, in accordance with one aspect of the present disclosure, a method of a user equipment ("UE") is provided for transmitting an UL data channel. The method may include: receiving first resource assignment information on a first UL data channel and second resource assignment information on a second UL data channel from a base station, and when the first and second UL data channels are needed to be transmitted by at least partially overlapping with each other in the time domain based on the first and second resource assignment information, preferentially assigning transmission power to one of the first and second UL data channels and adjusting the transmission power for the other.

In accordance with another aspect of the present disclosure, a method of a base station is provided for receiving an UL data channel. The method may include: transmitting first resource assignment information on a first UL data channel and second resource assignment information on a second UL data channel to a UE, and when the first and second UL data channels are needed to be transmitted by at least partially overlapping with each other in the time domain based on the first and second resource assignment information, receiving one of the first and second UL data channels with preferentially-assigned transmission power and the other with adjusted transmission power.

In accordance with further another aspect of the present disclosure, a UE is provided. The UE includes a receiver receiving first resource assignment information on a first UL data channel and second resource assignment information on a second UL data channel from a base station, and a controller preferentially assigning transmission power to one of the first and second UL data channels and adjusting the transmission power for the other when the first and second UL data channels are needed to be transmitted by at least partially overlapping with each other in the time domain based on the first and second resource assignment information.

Effects of the Invention

In accordance with embodiments of the present disclosure, it is possible efficiently to transmit UL data channels in various situations in which a plurality of UL data channel transmissions simultaneously occurs in one UE in the NR.

BEST MODE FOR CARRYING OUT THE INVENTION

Figure 1:
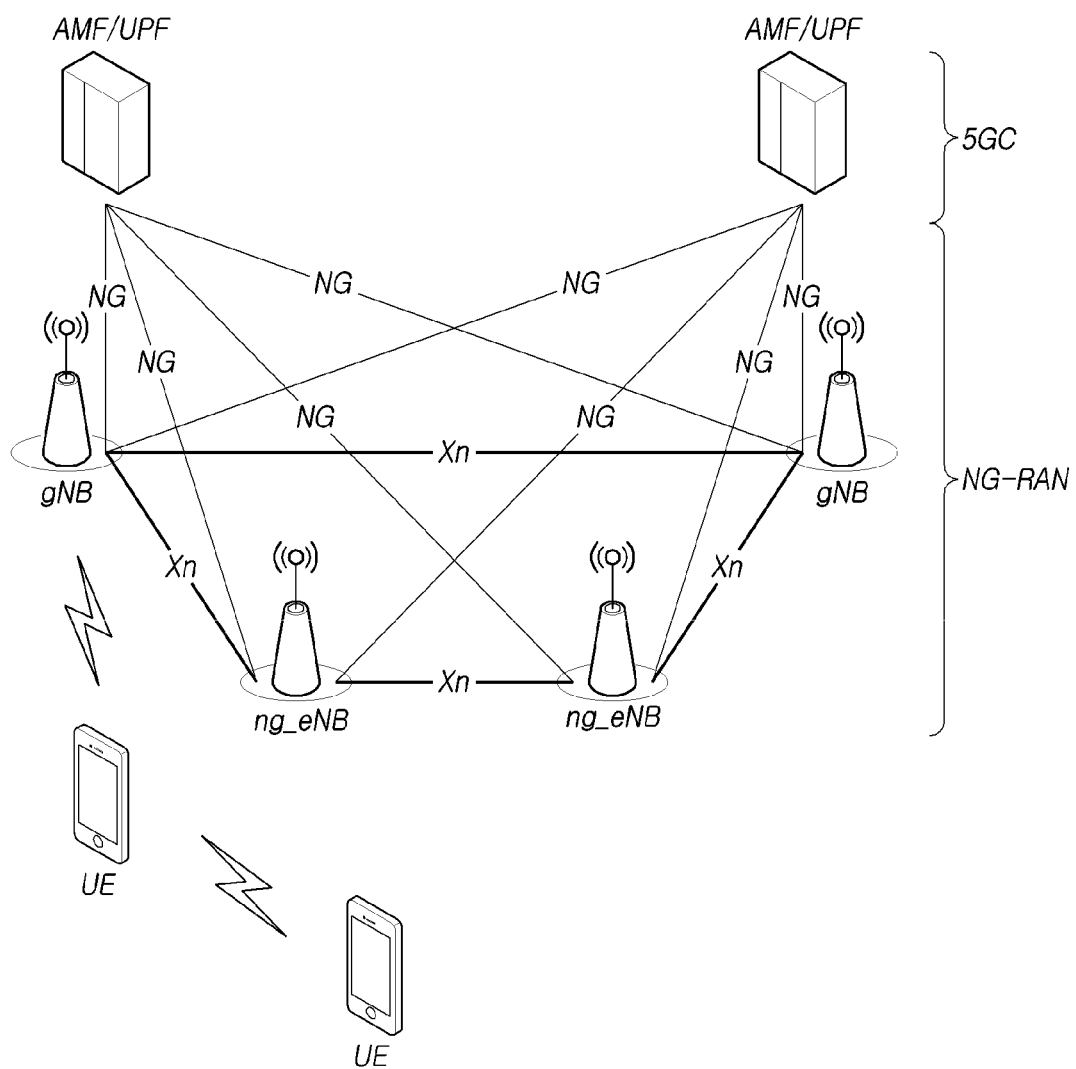
FIG. 1 schematically illustrates an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s). In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other. In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as $3^{rd}$ generation partnership project (3GPP), 3GPP2, WiFi, Bluetooth, institute of electrical and electrics engineers (IEEE), international telecommunication union (ITU), or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized. Furthermore, the embodiments may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or the UE may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to data transmission and reception from a UE to a base station, and a downlink (DL) refers to data transmission and reception from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 schematically illustrates an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a cyclic prefix (CP)-OFDM waveform using a cyclic prefix for downlink transmission and uses CP-OFDM or discrete Fourier transform spread (DFT-s)-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
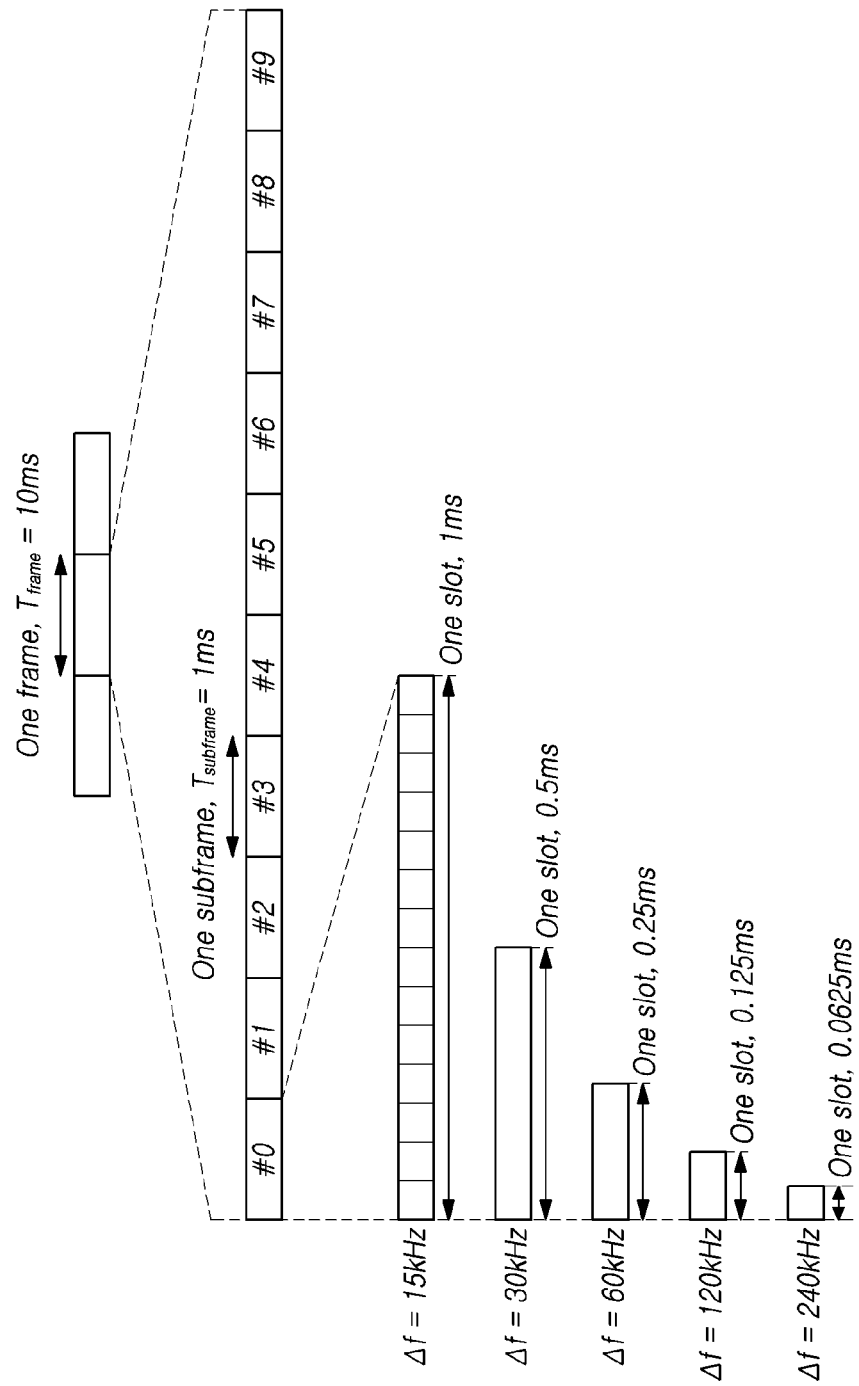
FIG. 2 schematically illustrates a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR, a frame is defined to include 10 subframes each having the same length of 1 ms and has a length of 10 ms. One frame may be divided into half frames of 5 ms, and each half frame includes 5 subframes. In the case of a subcarrier spacing of 15 kHz, one subframe includes one slot, and each slot includes 14 OFDM symbols. FIG. 2 illustrates a frame structure in an NR system. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing. NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically inform the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
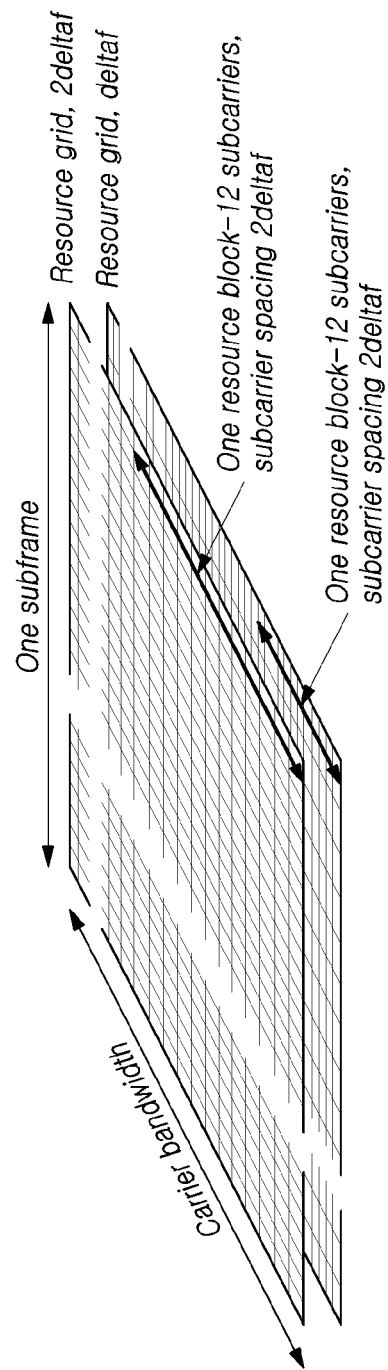
FIG. 3 illustrates resource grids supported by a radio access technology in accordance with embodiments of the present disclosure.

FIG. 3 is a view for explaining resource grids supported by a radio access technology.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
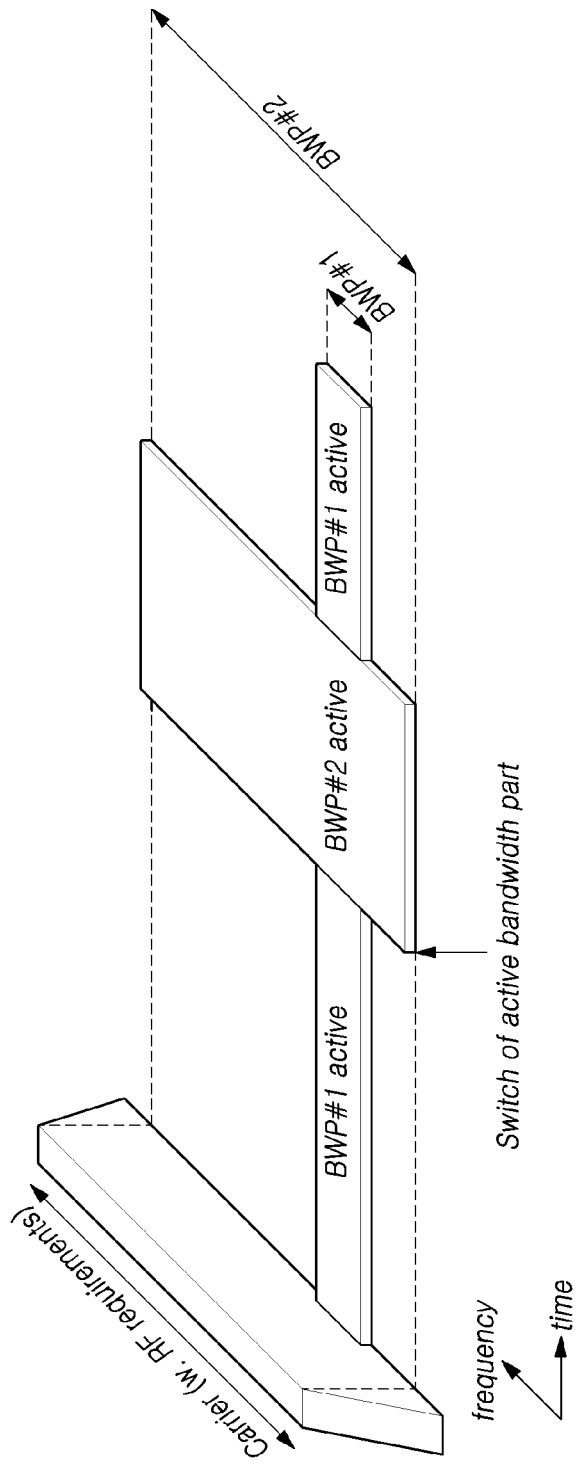
FIG. 4 illustrates bandwidth parts supported by a radio access technology in accordance with embodiments of the present disclosure.

FIG. 4 is a view for explaining bandwidth parts supported by a radio access technology.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
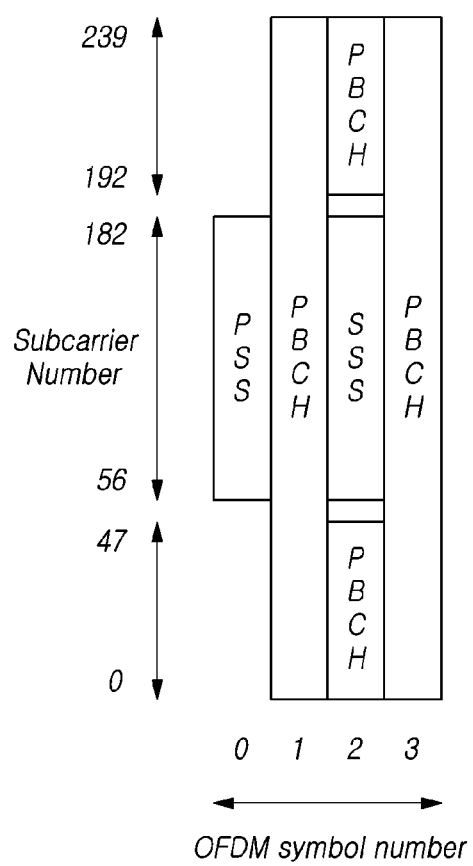
FIG. 5 illustrates an example of a synchronization signal block in a radio access technology in accordance with embodiments of the present disclosure.

FIG. 5 is a view illustrating an example of a synchronization signal block in a radio access technology to which the present embodiment is applicable.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
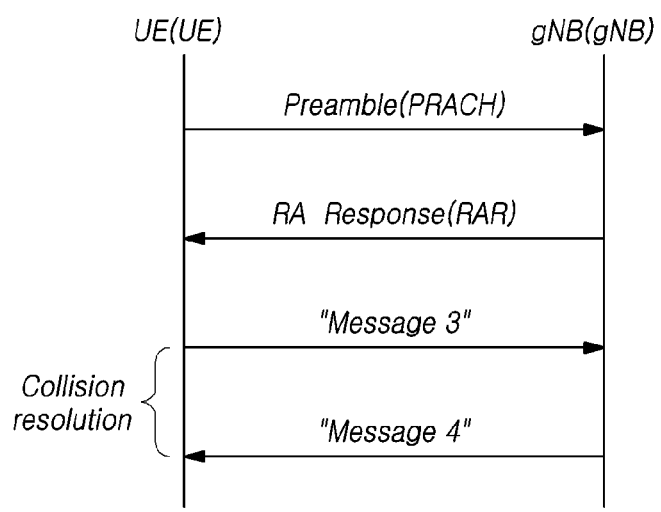
FIG. 6 is a signal diagram for explaining a random access procedure in a radio access technology in accordance with embodiments of the present disclosure.

FIG. 6 illustrates a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
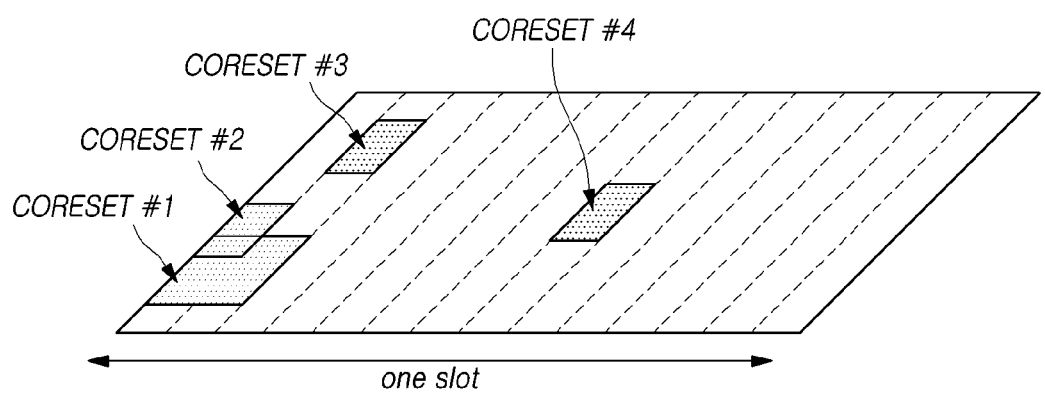
FIG. 7 illustrates CORESET.

FIG. 7 is a view for explaining CORESETs.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR(New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+an UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 8:
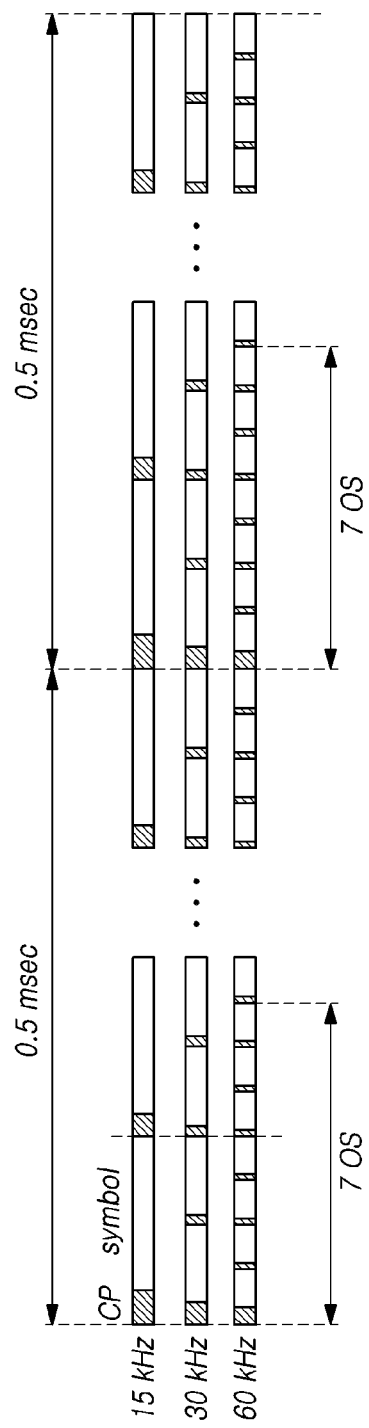
FIG. 8 illustrates an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

PDCCH

In NR and LTE/LTE-A systems, L1 control information (such as, DL assignment DL control information (DCI), UL grant DCI, and the like) is transmitted and/or received through a PDCCH. A control channel element (CCE) is defined as a resource unit for transmitting of the PDCCH. In the NR, a control resource set (CORESET) that is a frequency/time resource for the PDCCH transmission may be configured for each UE. Further, each CORESET may include one or more search spaces including one or more PDCCH candidates for allowing a UE to monitor the PDCCH.

Power Control

In NR and LTE/LTE-A system, UL transmission power of a UE is determined based on a maximum transmission power value of the UE, a higher layer parameter, path loss, a TPC command value transmitted through a DL control channel, and the like.

UL Transmission Procedure

Taking account of requirements for transmission delay and coverage, an UL control channel in the NR is classified into a short PUCCH structure and a long PUCCH structure for supporting different symbol lengths. Further, taking account of flexible resource configuration methods at a symbol level, various options are provided for a symbol length and a start symbol location of the PUCCH. Further, some functions are supported, such as an on/off-control DM-RS overhead configuration for frequency hopping of the PUCCH, and the like.

The NR have defined various types of PUSCH transmission methods, such as, mapping type B related to a PUSCH transmission based on a non-slot (i.e. based on a mini-slot) and an associated DM-RS transmission, an aggregated-slot based PUSCH transmission, a grant-free PUSCH transmission, or the like, in addition to mapping type A related to a PUSCH transmission based on a slot based on an UL grant and an associated PUSCH transmission which are identical to a PUSCH resource assignment method of the LTE/LTE-A systems and an associated PUSCH transmission operation of a UE.

<Wider Bandwidth Operations>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a typical LTE UE supports a transmission/reception capability of a bandwidth of 20 MHz for a single LTE CC.

Figure 9:
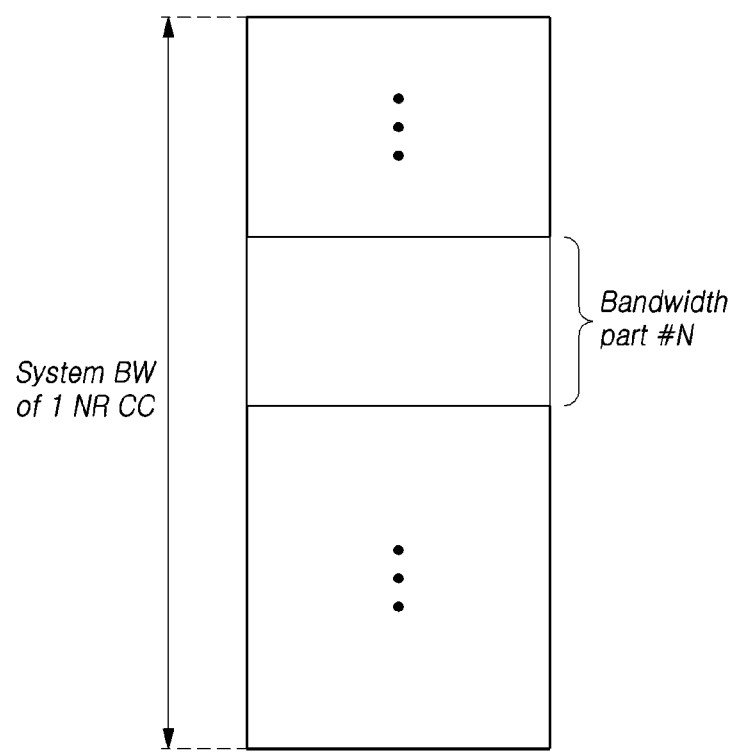
FIG. 9 schematically illustrates a bandwidth part in accordance with embodiments of the present disclosure.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

In accordance with embodiments of the present disclosure, provided are methods of transmitting an UL data channel, such as Physical UL Shared Channel (PUSCH), including UL data/control information for satisfying different service requirements in wireless mobile communication systems, such as the LTE/LTE-A, the NR, and the like. In particular, in the present disclosure, provided are PUSCH transmission methods of a UE when a plurality of PUSCH transmission resources is assigned through one or more identical slot(s) or symbol(s) in the UE.

As described above, as usage scenarios provided by the NR and LTE/LTE-A systems, there is increasing importance for an efficient support method for data related to the URLLC service requiring low latency and/or high reliability, in addition to support for data related to the eMBB service to maximize data transmission rate.

In particular, in the case of data related to the URLLC service, it is necessary to improve the reliability of data transmission and reception compared to the eMBB service, in addition to technology to minimize a latency period. To do this, it is necessary to improve the reliability of a PDSCH/PUSCH for UL/DL data transmission/reception.

As a method for satisfying such different reliability requirements, when UL data are transmitted in one UE, provided herein are methods for a PUSCH transmission of a UE and an associated transmission power control, when a collision between a plurality of PUSCH transmissions (i.e. a time-domain overlap between a plurality of PUSCH transmissions) based on different reliability requirements occurs.

When a UE transmits a PUSCH using a carrier f of a serving cell c using a parameter set configuration with index j and a PUSCH power control adjustment state with index l, transmission power ($P_{PUSCH, f, c}$ (i, j, qd, l)) for a PUSCH transmission of any UE in PUSCH transmission period i is determined by the Equation (1) below.

$$P_{PUSCH,f,c}(i, j, q_d, l) = \min \begin{Bmatrix} P_{CMAX,f,c}(i), \\ P_{O\_PUSCH,f,c}(j) + 10\log_{10}(2^\mu \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) \end{Bmatrix} \quad (1)$$

In the Equation (1), each of variables summarized below is specifically defined in "7. Uplink Power control" of TS38.213.

$P_{CMAX, f, c}$(i) is the UE configured maximum output power for carrier f of serving cell c in PUSCH transmission period i.

$P_{o\_PUSCH, f, c}$(j) is a parameter composed of the sum of a component $P_{O\_NOMINAL\_PUSCH, f,c}$(j) and a component $P_{O\_UE\_PUSCH, f,c}$(j).

u is a subcarrier spacing for a PUSCH on carrier f of serving cell c.

$M_{RB,f,c}^{PUSCH}$(i) is the bandwidth of the PUSCH resource assignment expressed in number of resource blocks for PUSCH transmission.

$\alpha_{f,c}$(j) is supplied by a specific higher layer parameter; $PL_{f,c}(q_d)$ is a downlink path-loss estimate in dB calculated by the UE using reference signal (RS) resource qd; $\Delta_{TF,f,c}$(i) is a offset value calculated by a specific higher layer parameter; and $f_{f,c}$(i, l) is a value representing a TPC command included downlink control information and a PUSCH power control adjustment state with index l calculated by a specific higher layer parameter.

When a UE performs an PUSCH transmission based on one or more slot(s) or a mini-slot (i.e. a non-slot), a PUSCH transmission power value is derived by Equation (1).

According to Equation (1), when any UE performs a PUSCH transmission, the UE derives a corresponding PUSCH transmission power value with a path-loss value between a base station and the UE, the number of assigned resource blocks, higher layer parameters, a value representing a TPC command, and the like. When the derived transmission power value is greater than a PCMAX value, a maximum transmission power value, set for the UE, transmits the PUSCH based on the maximum transmission power value.

However, to support URLLC data requiring low latency and high reliability as described above, there may occur not only a PUSCH transmission based on a slot or aggregated-slots (i.e. multiple slots) through an UL grant, but a PUSCH transmission based on a non-slot through the UL grant or a grant-free based PUSCH transmission.

Specifically, the PUSCH transmission based on an UL grant means a PUSCH transmission scheduled through dynamic L1 signaling, that is, a PUSCH transmission based on a dynamic grant, in which a transmission on resource assignment information for a PUSCH transmission is performed through a PDCCH that is a physical layer control channel.

The grant-free based PUSCH transmission is a PUSCH transmission based on RRC scheduling or RRC signaling+ physical layer control signaling, and it means a PUSCH transmission scheduled through a configured grant. For example, the grant-free based PUSCH transmission is classified into a type-1 configured grant based PUSCH transmission for transmitting all scheduling-related information for a PUSCH transmission through ConfiguredGrantConfig information transmitted through high layer signaling, and a type-2 configured grant based PUSCH transmission for transmitting scheduling information through high layer signaling and an UL grant.

Figure 10:
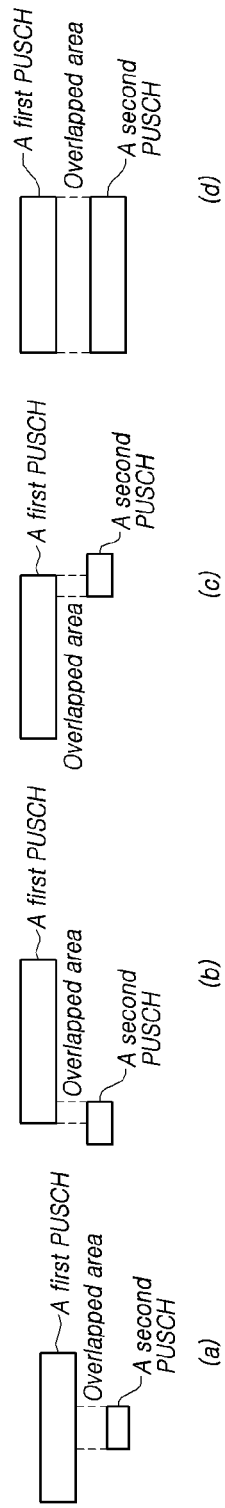
FIG. 10 illustrates simultaneous transmission of a plurality of PUSCHs in accordance with embodiments of the present disclosure.

FIG. 10 illustrates simultaneous transmission of a plurality of PUSCHs in accordance with embodiments of the present disclosure.

Referring to FIG. 10, because of an UL grant based PUSCH transmission and a grant-free based PUSCH transmission, there is a possibility that a plurality of PUSCHs (a first PUSCH and a second PUSCH) may be simultaneously transmitted with different time durations (FIGS. 10(*a*) to 10(*c*)). As shown in FIG. 10(*a*), the second PUSCH transmission may fully overlap with the first PUSCH transmission in the time domain. Further, as shown in FIGS. 10(*b*) and 10(*c*), the second PUSCH transmission may partially overlap with the first PUSCH transmission in the time domain.

As shown in FIG. 10(*d*), a plurality of PUSCH transmissions with an equal time duration may be simultaneously performed in one UE.

When the plurality of PUSCHs (the first PUSCH and the second PUSCH) is simultaneously transmitted, it is necessary to define a PUSCH transmission operation of a UE. Specifically, it is necessary to define a power assignment method for the plurality of PUSCH transmissions.

Herein, in various situations for simultaneous transmission of a plurality of PUSCHs in one UE, provided are PUSCH transmission operations of a UE and associated PUSCH transmission power control methods. In particular, herein, when simultaneously transmitting a plurality of PUSCHs in one UE, provided are PUSCH transmission power assignment methods based on priority.

Transmission power assignment described below denotes transmission power assignment for a corresponding PUSCH transmission in actual. According to this, whether the transmission of the corresponding PUSCH is available is determined. Further, first and second PUSCHs are described below as an example for describing a plurality of PUSCH transmissions; however, the plurality of PUSCH transmissions may include two or more PUSCHs.

Hereinafter, first, discussions will be given on methods of configuring priorities at the time of assigning PUSCH transmission power when a plurality of PUSCH transmissions simultaneously occurs in one UE. Next, discussions will be given on methods of transmitting/receiving an UL data channel to which at least one of the priority configuration methods is applied, in a UE and a base station.

Embodiment 1 Methods of Configuring Time-Duration Based Priorities

When one UE performs different PUSCH transmissions simultaneously, the UE may select a PUSCH to be preferentially transmitted based on time-domain resource assignment information among the PUSCHs, or to be preferentially assigned with transmission power.

Specifically, when one UE performs a plurality of PUSCH transmissions simultaneously, the UE may preferentially transmit one of the plurality of PUSCH transmissions taking account of respective PUSCH transmission time durations.

For example, the UE may preferentially transmit a PUSCH with a shortest PUSCH time duration taking account of the respective PUSCH transmission time durations. In another example, the UE may preferentially transmit a PUSCH with a longest PUSCH time duration taking account of the respective PUSCH transmission time durations.

In other words, in the former example, the UE may preferentially assign transmission power to a PUSCH with the shortest time duration of the plurality of PUSCHs. In the latter example, the UE may preferentially assign transmission power to a PUSCH with the longest time duration of the plurality of PUSCHs.

In the former example, the transmission power may be preferentially assigned to the transmission of the PUSCH with the shortest time duration, and one or more transmission(s) of one or more other PUSCH(s) overlapping with the transmission of the PUSCH with the shortest time duration in the time domain may be dropped. At this time, the dropping of the PUSCH transmission may include that a corresponding PUSCH is not transmitted or the transmission power of the corresponding PUSCH becomes "zero", i.e. is controlled to be zero. In further another example, transmission power may be preferentially assigned to the PUSCH with the shortest time duration, and remaining transmission power may be assigned to a PUSCH with a second shortest time duration.

The time-duration based priority configuration method according to Embodiment 1 may be applied i) only for one or more overlapped symbol(s), ii) for all symbols following a symbol at which a corresponding overlap is started, or iii) to the entire of one or more PUSCH transmission(s).

Figure 11:
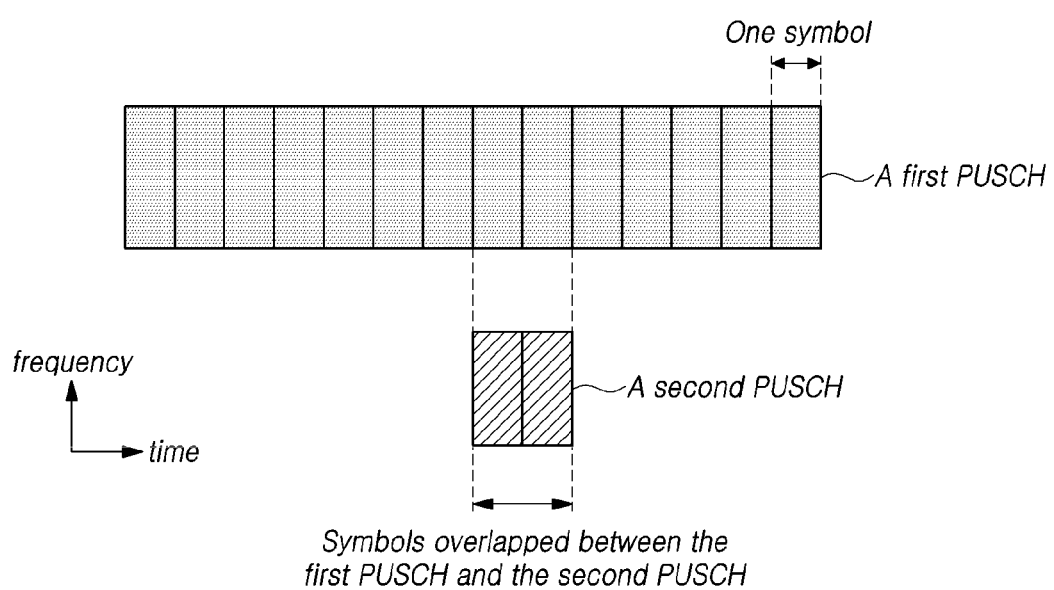
FIG. 11 is a diagram for describing a method of configuring priorities based on the time-duration according to Embodiment 1 when a collision occurs between first and second PUSCHs with different time durations in one UE.

FIG. 11 is a diagram for describing a method of configuring priorities based on the time-duration according to Embodiment 1 when a collision occurs between first and second PUSCHs with different time durations in one UE in.

As shown in FIG. 11, when a first PUSCH transmission is assigned on a slot basis and a second PUSCH transmission is assigned based on a non-slot of 2 symbols, priority may be given to the second PUSCH transmission with a shorter transmission time duration in the time domain. As a result, the first PUSCH transmission except for the second PUSCH may be dropped.

In this case, as described above, i) the entire of the first PUSCH transmission may be dropped irrespective of a duration of one or more overlapped symbol(s), ii) the first PUSCH transmission may be dropped only for the duration of one or more overlapped symbol(s), or iii) the first PUSCH transmission may be dropped only for symbols following a symbol at which a corresponding overlap is started.

In item ii), as an example of dropping the first PUSCH transmission only for the duration of the overlapped symbol (s), as shown in FIG. 11, a UE may drop a transmission of the first PUSCH only for corresponding eighth and ninth symbols and normally transmit the first PUSCH over remaining symbols.

In item iii), as an example of dropping the first PUSCH transmission only for symbols following a symbol at which an overlap is started, as shown in FIG. 11, a UE may normally transmit the first PUSCH up to seventh symbol before the overlap is started and then drop the first PUSCH transmission from eighth symbol to the last symbol.

As shown in FIG. 11, when the first PUSCH transmission is assigned on a slot basis and the second PUSCH transmission is assigned based on a non-slot of 2 symbols, a UE may preferentially assign PUSCH transmission power to the second PUSCH according to the Equation (1) or a new equation in case the new equation is defined for PUSCH transmission power. In case remaining transmission power is present, the UE may assign the remaining transmission power for the first PUSCH transmission.

In even this case, in the same way as the above example of PUSCH transmission dropping, i) transmission power may be assigned for the entire of the first PUSCH transmission based on the remaining power except for the power of the second PUSCH transmission, or ii) transmission power may be assigned only for the duration of overlapped symbol (s) based on the remaining power except for the power of the second PUSCH transmission, and in the remaining duration, the power of the first PUSCH transmission may be normally assigned according to the Equation (1) or a new equation in case the new equation is defined for PUSCH transmission power.

Or, iii) transmission power may be assigned only for symbols following a symbol at which the overlap is started based on the remaining power except for the power of the second PUSCH transmission. In the remaining duration, the power of the first PUSCH transmission may be normally assigned according to the Equation (1) or a new equation in case the new equation is defined for PUSCH transmission power.

It should be understood that a case in which priority is given to a PUSCH with a longer PUSCH time duration may be implemented in the same manner as the case in which priority is given to a PUSCH with a shorter PUSCH time duration as described above.

Embodiment 2 Methods of Configuring Priorities Based on the Presence or Absence of an UL Grant Reception When a collision between a plurality of PUSCH transmissions occurs in one UE, as another method of transmitting the PUSCHs, the UE may determine priorities over the PUSCHs based on the presence or absence of an UL grant reception. That is, a UE may determine priorities over corresponding PUSCHs according to whether a PUSCH transmission is based on an UL grant or based on a grant-free.

In one embodiment, a UE may preferentially perform a grant-free based PUSCH transmission. That is, a type-1 configured grant based PUSCH transmission or a type-2 configured grant based PUSCH transmission may have priority over a dynamic UL grant based PUSCH transmission.

Specifically, when one UE simultaneously performs an UL grant based PUSCH transmission and a grant-free based PUSCH transmission, the UE may preferentially transmit the grant-free based PUSCH transmission. That is, the UE may drop the entire of the UL grant based PUSCH transmission fully or partially overlapped with the grant-free based PUSCH transmission in the time domain. Alternatively, the UE may preferentially assign transmission power to the grant-free based PUSCH transmission, and the remaining power may be assigned for the UL grant based PUSCH transmission.

Figure 12:
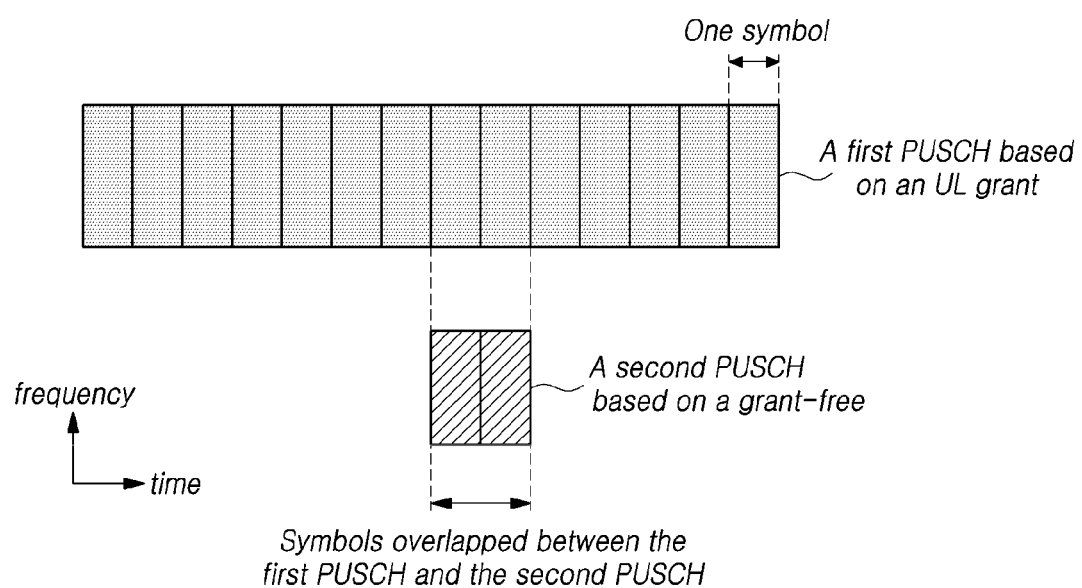
FIG. 12 is a diagram for describing a method for configuring priorities based on the presence or absence of an UL grant reception according to Embodiment 2 when a collision occurs between a first PUSCH based on an UL grant and a second PUSCH based on a grant-free in one UE.

FIG. 12 is a diagram for describing a method of configuring priorities based on the presence or absence of an UL grant reception according to Embodiment 2 when a collision occurs between a first PUSCH based on an UL grant and a second PUSCH based on a grant-free in one UE.

Referring to FIG. 12, when a collision between a first PUSCH transmission based on an UL grant and a second PUSCH transmission based on a grant-free occurs in one UE, the UE may give a priority to the second PUSCH transmission that is the grant-free based PUSCH transmission. As a result, the UE may drop the first PUSCH transmission except for the second PUSCH.

In this case, as described above, i) the entire of the first PUSCH transmission may be dropped irrespective of a duration of one or more overlapped symbol(s), ii) the first PUSCH transmission may be dropped only for the duration of one or more overlapped symbol(s), or iii) the first PUSCH transmission may be dropped only for symbols following a symbol at which a corresponding overlap is started.

In item ii), as an example of dropping the first PUSCH transmission only for the duration of the overlapped symbol (s), as shown in FIG. 12, a UE may drop a transmission of the first PUSCH only for corresponding eighth and ninth symbols, and the UE may normally transmit the first PUSCH over remaining symbols.

In item iii), as an example of dropping the first PUSCH transmission only for symbols following a symbol at which an overlap is started, as shown in FIG. 11, a UE may normally transmit the first PUSCH up to seventh symbol before the overlap is started and then drop the first PUSCH transmission from eighth symbol to the last symbol.

As shown in FIG. 12, when the UL grant based PUSCH transmission and the grant-free based PUSCH transmission are assigned, a UE may preferentially assign PUSCH transmission power to the second PUSCH based on the grant-free according to the Equation (1) or a new equation in case the new equation is defined for PUSCH transmission power. In case remaining transmission power is present, the UE may assign the remaining transmission power for the first PUSCH transmission based on the UL grant.

In even this case, in the same way as the above example of PUSCH transmission dropping, i) transmission power may be assigned for the entire of the first PUSCH transmission based on the remaining power except for the power of the second PUSCH transmission, or ii) transmission power may be assigned only for the duration of overlapped symbol (s) based on the remaining power except for the power of the second PUSCH transmission, and in the remaining duration, the power of the first PUSCH transmission may be normally assigned according to the Equation (1) or a new equation in case the new equation is defined for PUSCH transmission power.

Or, iii) transmission power may be assigned only for symbols following a symbol at which the overlap is started based on the remaining power except for the power of the second PUSCH transmission, and in the remaining duration, the power of the first PUSCH transmission may be normally assigned according to the Equation (1) or a new equation in case the new equation is defined for PUSCH transmission power.

It should be understood that a case in which priority is given to the UL grant based PUSCH (the first PUSCH) may be implemented in the same manner as a case in which priority is given to the grant-free based PUSCH (the second PUSCH).

Additionally, when a collision between configured grant based PUSCH transmissions occurs, priority may be defined according to a corresponding configured grant type. For example, a type-1 configured grant based PUSCH transmission may have priority over a type-2 configured grant based PUSCH transmission, or the type-2 configured grant based PUSCH transmission may have priority over the type-1 configured grant based PUSCH transmission. The foregoing description may be substantially equally applied to specific PUSCH transmission methods according to this.

Embodiment 3 Methods of Configuring Priorities Based on UL Grant Reception Timings When a collision between a plurality of PUSCH transmissions occurs in one UE, as further another method of transmitting the PUSCHs, the UE may determine priorities over the PUSCHs based on UL grant transmitting or receiving timings corresponding to the respective PUSCHs.

For example, the UE may preferentially transmit a PUSCH having a latest UL transmitting or receiving timing. That is, when a plurality of PUSCH transmissions fully or partially overlaps in the time domain in one UE, the UE may preferentially transmit a PUSCH having a latest UL transmitting or receiving timing of UL grant transmitting or receiving timings corresponding to the respective PUSCHs. Then, the UE may drop the remaining PUSCHs or may preferentially assign transmission power to a PUSCH on which an UL grant is transmitted or received most recently and then assign the remaining power to other PUSCHs.

Figure 13:
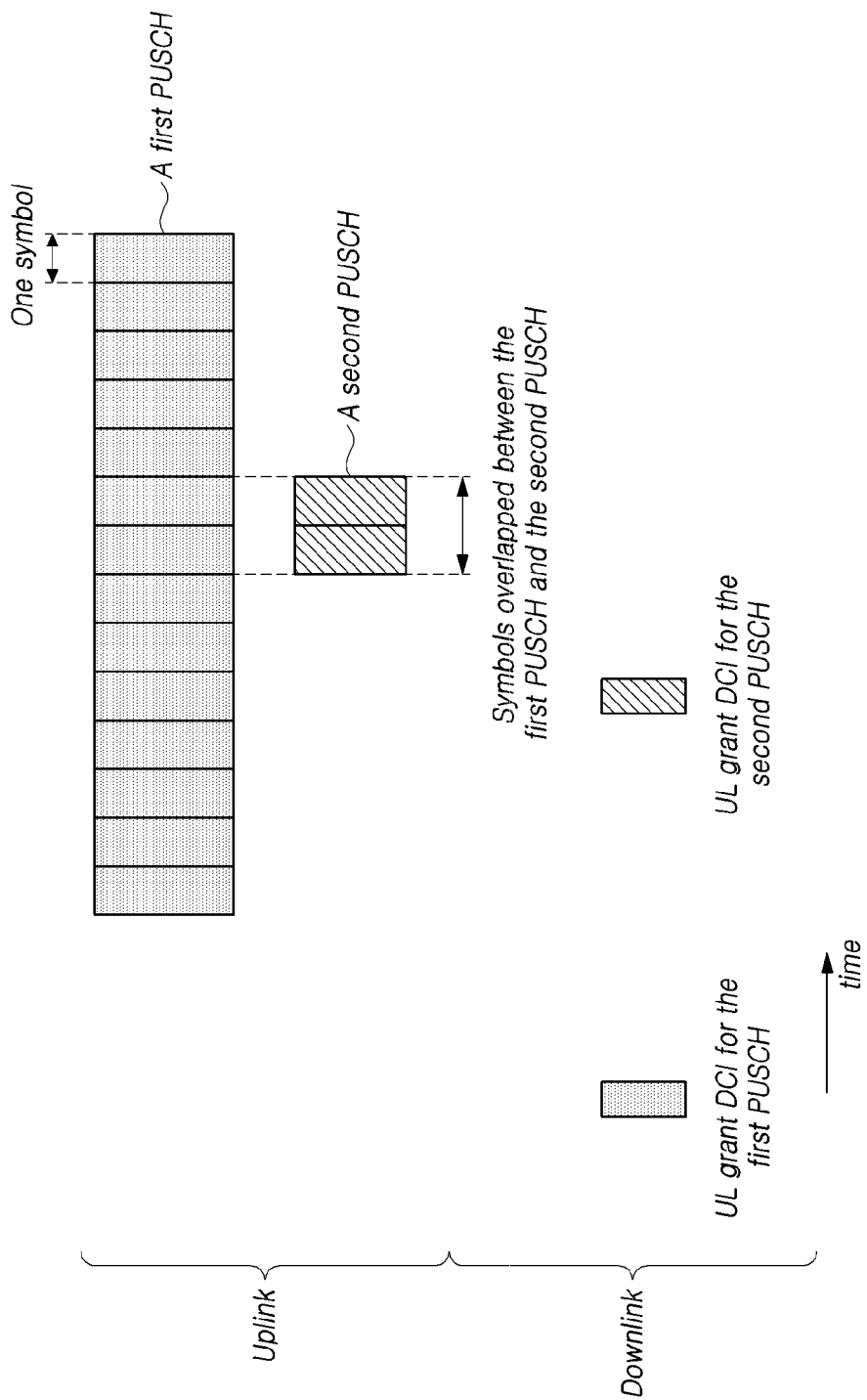
FIG. 13 is a diagram for describing the determination of priorities based on different UL grant transmission/reception timings in one UE in a method of configuring priorities based on UL grant reception timings according to Embodiment 3.

FIG. 13 is a diagram for describing the determination of priorities based on different UL grant transmission/reception timings in one UE in a priority configuration method based on UL grant reception timings according to Embodiment 3.

Referring to FIG. 13, when a collision occurs between a first PUSCH transmission and a second PUSCH transmission in one UE, the UE may give a priority to the second PUSCH transmission that has received an UL grant for the corresponding PUSCH most recently. As a result, the UE may drop the first PUSCH transmission except for the second PUSCH.

In this case, as described above, i) the entire of the first PUSCH transmission may be dropped irrespective of a duration of one or more overlapped symbol(s), ii) the first PUSCH transmission may be dropped only for the duration of one or more overlapped symbol(s), or iii) the first PUSCH transmission may be dropped only for symbols following a symbol at which a corresponding overlap is started.

In item ii), as an example of dropping the first PUSCH transmission only for the duration of the overlapped symbol (s), as shown in FIG. 13, a UE may drop a transmission of the first PUSCH only for corresponding eighth and ninth symbols, and normally transmit the first PUSCH over remaining symbols.

In item iii), as an example of dropping the first PUSCH transmission only for symbols following a symbol at which an overlap is started, as shown in FIG. 13, a UE may normally transmit the first PUSCH up to seventh symbol before the overlap is started, and then the UE may drop the first PUSCH transmission from eighth symbol to the last symbol.

As shown in FIG. 13, a corresponding UE may assign PUSCH transmission power to the second PUSCH transmission that has received an UL grant for the corresponding PUSCH most recently according to the Equation (1) or a new equation in case the new equation is defined for PUSCH transmission power. In case remaining transmission power is present, the UE may assign the remaining transmission power for the first PUSCH transmission.

In even this case, in the same way as the above example of PUSCH transmission dropping, i) transmission power may be assigned for the entire of the first PUSCH transmission based on the remaining power except for the power of the second PUSCH transmission, or ii) transmission power may be assigned only for the duration of overlapped symbol (s) based on the remaining power except for the power of the second PUSCH transmission. In the remaining duration, the power of the first PUSCH transmission may be normally assigned according to the Equation (1) or a new equation in case the new equation is defined for PUSCH transmission power.

Or, iii) transmission power may be assigned only for symbols following a symbol at which the overlap is started based on the remaining power except for the power of the second PUSCH transmission, and in the remaining duration, the power of the first PUSCH transmission may be normally assigned according to the Equation (1) or a new equation in case the new equation is defined for PUSCH transmission power.

It should be understood that a case in which priority is given to a PUSCH having an earliest UL grant transmitting time (the first PUSCH) may be implemented in the same manner as a case in which priority is given to a PUSCH that has received an UL grant for the corresponding PUSCH most recently (the second PUSCH).

Embodiment 4 Methods of Configuring Priorities Based on Mapping Types

When a collision occurs between a plurality of PUSCH transmissions in one UE, as yet another method of transmitting the PUSCHs, the UE may determine priorities over the PUSCH transmissions based on PUSCH mapping types (i.e. mapping type A vs. mapping type B) defined in 3GPP TS 38.214.

For example, the UE may preferentially transmit a PUSCH transmission based on the mapping type B over a PUSCH transmission based on the mapping type A. That is, when PUSCH transmissions configured with different mapping types fully or partially overlap in the time domain in one UE, the UE may preferentially transmit a PUSCH based on the mapping type B and drop a PUSCH based on the mapping type A, or preferentially assign transmission power to the PUSCH based on the mapping type B and the remaining power to other PUSCH(s) (i.e. the PUSCH(s) based on the mapping type A).

As another example, the UE may preferentially transmit the PUSCH transmission based on the mapping type A over the PUSCH transmission based on the mapping type B.

Like this, methods of specifically determining PUSCH transmission priorities based on mapping types may be implemented in the same manner as embodiments related to the Embodiment 1 to the Embodiment 3 described above; thus, associated specific description will not be repeatedly given.

Additionally, a base station may signal configuration information related to a PUSCH transmission priority rule according to the plurality of PUSCH transmission collision scenarios for respective embodiments described above.

For example, when a collision occurs in a plurality of PUSCH transmissions between a configured grant and a dynamic grant of the Embodiment 2, the base station may configure configuration information on a PUSCH with a higher priority needed to transmit preferentially in a UE. Then, the base station may transmit the configured information to UE through high layer signaling or physical layer control signaling.

For example, the base station may configure configuration information on a priority or a priority level for a PUSCH collision between a configured UL grant and a dynamic UL grant, as in the Embodiment 2, and then, the base station may transmit the configured information through high layer signaling.

Here, the priority means prioritization for PUSCH transmissions that can be defined as levels, such as high, medium, low etc. and the priority level includes numerical values corresponding to the respective priorities. That is, the priority level is classified into specific constants mapped on priorities given to respective PUSCH transmissions, and the priority level may be any natural number or an integer greater than or equal to 0 and be configured or indicated by a base station. A UE may determine to transmit a PUSCH with a higher priority of PUSCH transmissions for which the collision has occurred by comparing priority level values mapped on respective PUSCH transmissions. For example, a UE may be defined to determine a PUSCH with a higher priority level or a PUSCH with a lower priority level as a PUSCH transmission with a higher priority.

For example, a base station may configure a priority or a priority level for PUSCHs based on UL grants configured through ConfiguredGrantConfig, which is high layer signaling for a configured UL grant information transmission, or separate high layer signaling. A UE may preferentially transmit a PUSCH configured with a higher priority or a PUSCH configured with a higher priority level based on corresponding priority or priority level configuration information.

That is, when a configured UL grant PUSCH is configured with a higher priority or a higher priority level, the UE may preferentially transmit a PUSCH for the configured UL grant according to the Embodiment 2; on the contrary, when the configured UL grant is configured with a lower priority or a lower priority level, the UE may preferentially transmit a PUSCH based on a dynamic UL grant.

As another example, the priority or priority level may be defined to be indicated through physical layer control signaling, that is, a dynamic UL grant.

As still another example, in the case of a configured grant based PUSCH, a priority or a priority level for the configured grant based PUSCH may be configured through high layer signaling. In the case of a dynamic grant based PUSCH, a priority or a priority level of a corresponding PUSCH may be defined to be indicated through a corresponding dynamic grant for each PUSCH transmission, that is, an UL grant DCI format transmitted through a PDDCH. According to this, when a configured grant based PUSCH and a dynamic grant based PUSCH collide, the UE may be defined to determine priorities over corresponding PUSCH transmissions by comparing a priority or priority level configuration value for the configured grant based PUSCH with a dynamic priority or priority level indication value for each PUSCH transmission indicated through the UL grant.

According to this, in the Embodiment 1 to the Embodiment 4, when a collision occurs between PUSCH transmissions indicated through a dynamic UL grant, or when a collision occurs between a dynamic UL grant based PUSCH transmission and a configured UL grant based PUSCH transmission, a base station may include and transmit priority or priority level indication information for the dynamic UL grant based PUSCH transmission in a corresponding UL grant. According to that value, the UE may determine priorities for PUSCH transmissions described in the Embodiment 1 to the Embodiment 4, and based on the priorities, determine whether to transmit the corresponding PUSCH(s).

As further another example, a priority or priority level over PUSCH transmissions may be separately indicated through separate physical layer control signaling for each slot or for each slot group. At this time, the base station may configure whether to indicate a corresponding priority or priority level information region through the physical layer control signaling through UE-specific or cell-specific high layer signaling.

Like this, in case the priority or priority level information is configured/indicated through high layer signaling or physical layer control signaling, when a collision occurs between any PUSCH transmissions, the UE may preferentially transmit a PUSCH with a higher priority or a high priority level according to corresponding configuration/indication information. For a case where a priority or priority level is not configured/indicated, the UE may define the priority rules defined in the Embodiment 1 to the Embodiment 4 as default operations and then based on this, perform a corresponding PUSCH transmission.

Additionally, embodiments of the present disclosure may be applied for all cases in which priorities are determined over corresponding PUSCH transmissions in the form of all combinations of the Embodiment 1 to the Embodiment 4.

Figure 14:
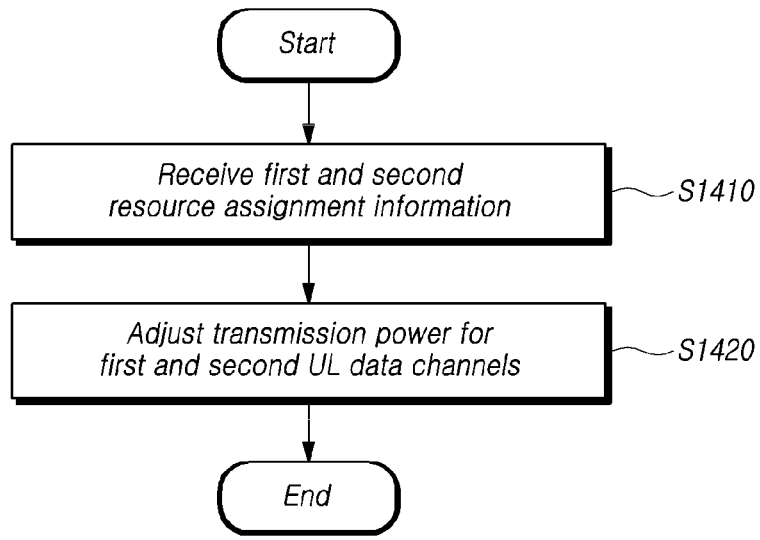
FIG. 14 is a flow diagram illustrating a method of transmitting an UL data channel by a UE in accordance with embodiments of the present disclosure.

FIG. 14 is a flow diagram illustrating a method of transmitting an UL data channel by a UE in accordance with embodiments of the present disclosure.

Referring to FIG. 14. a method of transmitting an UL data channel by a UE may include: receiving first resource assignment information on a first UL data channel and second resource assignment information on a second UL data channel from a base station, at step S1410, and when the first and second UL data channels are needed to be transmitted by at least partially overlapping with each other in the time domain based on the first and second resource assignment information, preferentially assigning transmission power to one of the first and second UL data channels and adjusting the transmission power for the other, at step S1420.

The adjusting of the transmission power on the other may be to preferentially assign the transmission power to one of the first and second UL data channels, and as a result, assign remaining transmission power to the other, or drop remaining UL data channel transmission(s) by controlling the transmission power to be zero.

When assigning the remaining transmission power to the other of the first and second UL data channels or dropping remaining UL data channel transmission(s) by controlling the transmission power to be zero, the remaining transmission power may be assigned for only one or more symbol(s) on which the first and second UL data channels overlap in the time domain, for all symbols following the one or more overlapped symbol(s), or for all symbols. Alternatively, the transmission power may be controlled to be zero, and the remaining UL data channel transmission(s) may be dropped.

Priority configuration methods may be priority configuration methods according to the Embodiment 1 to the Embodiment 4, for example, the time-duration based priority configuration method, the priority configuration method based on the presence or absence of an UL grant reception, the priority configuration method based on UL grant reception timings, or the priority configuration method based on mapping types.

According to the time-duration based priority configuration method of the Embodiment 1, when preferentially assigning transmission power to one of first and second UL data channels, the transmission power may be assigned to an UL data channel with the shortest time duration or the longest time duration of time durations of the first and second UL data channels.

As shown in FIG. 11, when a first PUSCH transmission is assigned on a slot basis and a second PUSCH transmission is assigned based on a non-slot of 2 symbols, priority may be given to the second PUSCH transmission with a shorter transmission time duration in the time domain. As a result, the first PUSCH transmission except for the second PUSCH may be dropped.

As shown in FIG. 11, when the first PUSCH transmission is assigned on a slot basis and the second PUSCH transmission is assigned based on a non-slot of 2 symbols, a UE may preferentially assign PUSCH transmission power to the second PUSCH according to the Equation (1) or a new equation in case the new equation is defined for PUSCH transmission power. In case remaining transmission power is present, the UE may assign the remaining transmission power for the first PUSCH transmission.

According to the priority configuration method based on the presence or absence of an UL grant reception of the Embodiment 2, in the step S1410 of receiving first and second resource assignment information from a base station, one of the first and second resource assignment information may be received through a first DL control channel from the base station and the other of the first and second resource assignment information may be received from the base station through one of i) high layer signaling and ii) high layer signaling+a second DL control channel.

When preferentially assigning transmission power to one of the first and second UL data channels, the transmission power may be preferentially assigned to an UL data channel corresponding to resource assignment information received through the first DL control channel or to an UL data channel corresponding to the resource assignment information received through one of i) the high layer signaling and ii) the high layer signaling+the second DL control channel.

In the step S1410 of receiving first and second resource assignment information from a base station, one of the first and second resource assignment information may be received from a base station through first high layer signaling, and the other may be received from the base station through second high layer signaling+a DL control channel.

When preferentially assigning transmission power to one of the first and second UL data channels, the transmission power may be preferentially assigned to an UL data channel corresponding to resource assignment information received through the first high layer signaling or to an UL data channel corresponding to the resource assignment information received through the second high layer signaling+the DL control channel.

Referring to FIG. 12, when a collision occurs between a first PUSCH transmission based on an UL grant and a second PUSCH transmission based on a grant-free in one UE, the UE may give a priority to the second PUSCH transmission that is the grant-free based PUSCH transmission. As a result, the UE may drop the first PUSCH transmission except for the second PUSCH.

As shown in FIG. 12, when the UL grant based PUSCH transmission and the grant-free based PUSCH transmission are assigned, a UE may preferentially assign PUSCH transmission power to the second PUSCH based on the grant-free according to the Equation (1) or a new equation in case the new equation is defined for PUSCH transmission power. In case remaining transmission power is present, the UE may assign the remaining transmission power for the first PUSCH transmission based on the UL grant.

Additionally, when a collision occurs between configured grant based PUSCH transmissions, priority may be defined according to a corresponding configured grant type. For example, a type-1 configured grant based PUSCH transmission may have priority over a type-2 configured grant based PUSCH transmission, or the type-2 configured grant based PUSCH transmission may have priority over the type-1 configured grant based PUSCH transmission. The foregoing description may be substantially equally applied to specific PUSCH transmission methods according to this.

According to the priority configuration method based on UL grant reception timings of the Embodiment 3, when preferentially assigning transmission power to one of first and second UL data channels, the transmission power may be preferentially assigned to one of the first and second UL data channels according to reception timings of first and second resource assignment information.

For example, the transmission power may be preferentially assigned to an UL data channel corresponding to resource assignment information having the most recent reception timing of the first and second resource assignment information. On the contrary, the transmission power may be preferentially assigned to an UL data channel corresponding to resource assignment information having the most late reception timing of the first and second resource assignment information.

Referring to FIG. 13, when a collision between a first PUSCH transmission and a second PUSCH transmission occurs in one UE, the UE may give a priority to the second PUSCH transmission that has received an UL grant for the corresponding PUSCH most recently, and as a result, drop the first PUSCH transmission except for the second PUSCH.

As shown in FIG. 13, a corresponding UE may assign PUSCH transmission power to the second PUSCH transmission that has received an UL grant for the corresponding PUSCH most recently according to the Equation (1) or a new equation in case the new equation is defined for PUSCH transmission power, and in case remaining transmission power is present, may assign the remaining transmission power for the first PUSCH transmission.

According to the mapping type based priority configuration of the Embodiment 4, when preferentially assigning transmission power to one of first and second UL data channels, the transmission power may be preferentially assigned to one of the first and second UL data channels according to mapping types of the first and second UL data channels.

When preferentially assigning the transmission power to one of first and second UL data channels, the transmission power may be preferentially assigned to one of the first and second UL data channels based on priority configuration information received through high layer signaling or a DL control channel.

The priority configuration information may indicate one of the following methods.

i) A method of preferentially assigning transmission power to an UL data channel with the shortest time duration or the longest time duration of time durations of first and second UL data channels (the time-duration based priority configuration method according to the Embodiment 1), ii) A method of preferentially assigning transmission power to an UL data channel corresponding to resource assignment information received through a first DL control channel or to an UL data channel corresponding to resource assignment information received through one of i) high layer signaling and ii) high layer signaling+a second DL control channel (the priority configuration method based on the presence or absence of an UL grant reception according to the Embodiment 2).

iii) A method of preferentially assigning transmission power to one of first and second UL data channels according to reception timings of first and second resource assignment information (the priority configuration method based on UL grant reception timings according to the Embodiment 3), iv) A method of preferentially assigning transmission power to one of first and second UL data channels according to mapping types of the first and second UL data channels (the mapping type based priority configuration method according to the Embodiment 4).

When preferentially assigning the transmission power to one of first and second UL data channels, when priority configuration information is not received, the transmission power may be preferentially assigned to one of the first and second UL data channels according to a predefined priority or a default priority.

Figure 15:
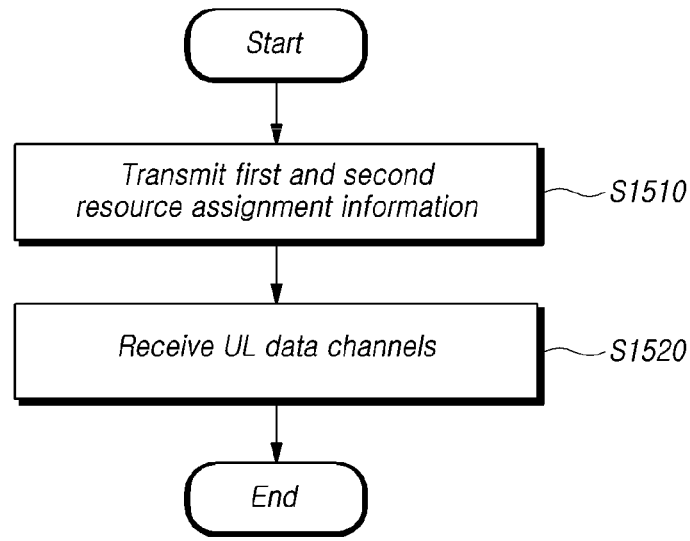
FIG. 15 is a flow diagram illustrating a method of receiving an UL data channel by a base station in accordance with embodiments of the present disclosure.

FIG. 15 is a flow diagram illustrating a method of receiving an UL data channel by a base station in accordance with embodiments of the present disclosure.

Referring to FIG. 15, a method of a base station for receiving an UL data channel may include: transmitting first resource assignment information on a first UL data channel and second resource assignment information on a second UL data channel to a UE, at step S1510, and when the first and second UL data channels are needed to be transmitted by at least partially overlapping with each other in the time domain based on the first and second resource assignment information, receiving the first and second UL data channels when transmission power is preferentially assigned to one of the first and second UL data channels and is adjusted to the other, at step S1520.

The adjusting of the transmission power on the other may include preferentially assigning the transmission power to one of the first and second UL data channels. As a result, remaining transmission power may be assigned to the other, or remaining UL data channel transmission(s) may be dropped by controlling the transmission power to be zero.

When assigning the remaining transmission power to the other of the first and second UL data channels or dropping remaining UL data channel transmission(s) by controlling the transmission power to be zero, the remaining transmission power may be assigned for only one or more symbol(s) on which the first and second UL data channels overlap in the time domain, for all symbols following the one or more overlapped symbol(s), or for all symbols, or the transmission power may be controlled to be zero and remaining UL data channel transmission(s) may be dropped.

As described above, priority configuration methods may be priority configuration methods according to the Embodiment 1 to the Embodiment 4, for example, the time-duration based priority configuration method, the priority configuration method based on the presence or absence of an UL grant reception, the priority configuration method based on UL grant reception timings, or the priority configuration method based on mapping types.

According to the time-duration based priority configuration method of the Embodiment 1, transmission power may be preferentially assigned to an UL data channel with the shortest time duration or the longest time duration of time durations of first and second UL data channels.

According to the priority configuration method based on the presence or absence of an UL grant reception of the Embodiment 2, in the step S1510 of transmitting first and second resource assignment information to a UE, one of the first and second resource assignment information may be transmitted to the UE through a first DL control channel and the other of the first and second resource assignment information may be transmitted to the UE through one of i) high layer signaling and ii) high layer signaling+a second DL control channel.

The transmission power may be preferentially assigned to an UL data channel corresponding to resource assignment information received through the first DL control channel of the first and second UL data channels or to an UL data channel corresponding to resource assignment information received through one of i) the high layer signaling and ii) the high layer signaling+the second DL control channel.

In the step S1510 of transmitting first and second resource assignment information to a UE, one of the first and second resource assignment information may be transmitted to the UE through first high layer signaling, and the other may be transmitted to the UE through second high layer signaling+a DL control channel.

When preferentially assigning transmission power to one of the first and second UL data channels, the transmission power may be preferentially assigned to an UL data channel corresponding to resource assignment information received through the first high layer signaling or to an UL data channel corresponding to the resource assignment information received through the second high layer signaling+the DL control channel.

According to the priority configuration method based on UL grant reception timings of the Embodiment 3, transmission power may be preferentially assigned to one of first and second UL data channels according to reception timings of first and second resource assignment information.

For example, the transmission power may be preferentially assigned to an UL data channel corresponding to resource assignment information having the most recent reception timing of the first and second resource assignment information. On the contrary, the transmission power may be preferentially assigned to an UL data channel corresponding to resource assignment information having the most late reception timing of the first and second resource assignment information.

According to the priority configuration method based on UL grant reception timings of the Embodiment 4, transmission power may be preferentially assigned to one of first and second UL data channels according to mapping types of the first and second UL data channels.

The transmission power may be preferentially assigned to one of the first and second UL data channels based on priority configuration information received through high layer signaling or a DL control channel.

The priority configuration information may indicate one of the following methods.

i) A method of preferentially assigning transmission power to an UL data channel with the shortest time duration or the longest time duration of time durations of first and second UL data channels (the time-duration based priority configuration method according to the Embodiment 1), ii) A method of preferentially assigning transmission power to an UL data channel corresponding to resource assignment information received through a first DL control channel or to an UL data channel corresponding to resource assignment information received through one of i) high layer signaling and ii) high layer signaling+a second DL control channel (the priority configuration method based on the presence or absence of an UL grant reception according to the Embodiment 2).

iii) A method of preferentially assigning transmission power to one of first and second UL data channels according to reception timings of first and second resource assignment information (the priority configuration method based on UL grant reception timings according to the Embodiment 3), iv) A method of preferentially assigning transmission power to one of first and second UL data channels according to mapping types of the first and second UL data channels (the mapping type based priority configuration method according to the Embodiment 4).

When preferentially assigning the transmission power to one of first and second UL data channels, when priority configuration information is not received, the transmission power may be preferentially assigned to one of the first and second UL data channels according to a predefined priority or a default priority.

Figure 16:
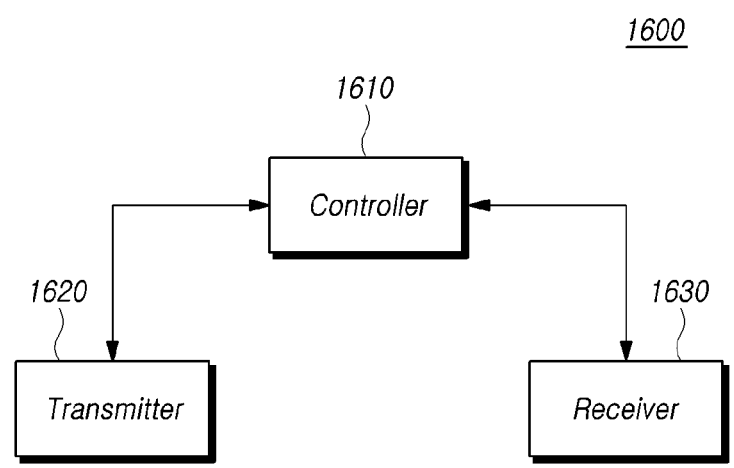
FIG. 16 is a block diagram illustrating a base station in accordance with embodiments of the present disclosure.

FIG. 16 is a block diagram illustrating a base station 1600 in accordance with embodiments of the present disclosure.

Referring to FIG. 16, the base station 1600 includes a controller 1610, a transmitter 1620, and a receiver 1630.

The controller 1610 controls overall operations of the base station 1600 needed to perform methods of transmitting/receiving UL data channels in the NR according to the embodiments of the present disclosure described above.

The transmitter 1620 transmits signals, messages, and data needed for carrying out the embodiments described above to a UE. The receiver 1630 receives signals, messages, and data needed for carrying out the embodiments described above from the UE.

A base station may include: a transmitter 1620 transmitting first resource assignment information on a first UL data channel and second resource assignment information on a second UL data channel to a UE, and when the first and second UL data channels are needed to be transmitted by at least partially overlapping with each other in the time domain based on the first and second resource assignment information, a receiver 1630 receiving the first and second UL data channels in case transmission power is preferentially assigned to one of the first and second UL data channels and is adjusted to the other.

The adjusting of the transmission power on the other may include preferentially assigning the transmission power to one of the first and second UL data channels. As a result, remaining transmission power may be assigned to the other, or remaining UL data channel transmission(s) may be dropped by controlling the transmission power to be zero.

When assigning the remaining transmission power to the other of the first and second UL data channels or dropping remaining UL data channel transmission(s) by controlling the transmission power to be zero, the remaining transmission power may be assigned for only one or more symbol(s) on which the first and second UL data channels overlap in the time domain, for all symbols following the one or more overlapped symbol(s), or for all symbols, or the transmission power may be controlled to be zero and remaining UL data channel transmission(s) may be dropped.

As described above, priority configuration methods may be priority configuration methods according to the Embodiment 1 to the Embodiment 4, for example, the time-duration based priority configuration method, the priority configuration method based on the presence or absence of an UL grant reception, the priority configuration method based on UL grant reception timings, or the priority configuration method based on mapping types.

According to the time-duration based priority configuration method of the Embodiment 1, transmission power may be preferentially assigned to an UL data channel with the shortest time duration or the longest time duration of time durations of first and second UL data channels.

According to the priority configuration method based on the presence or absence of an UL grant reception of the Embodiment 2, the transmitter 1620 may transmit one of the first and second resource assignment information to a UE through a first DL control channel and the other of the first and second resource assignment information to the UE through one of i) high layer signaling and ii) high layer signaling+a second DL control channel.

The transmission power may be preferentially assigned to an UL data channel corresponding to resource assignment information received through the first DL control channel of the first and second UL data channels or to an UL data channel corresponding to resource assignment information received through one of i) the high layer signaling and ii) the high layer signaling+the second DL control channel.

The transmitter 1620 may transmit one of first and second resource assignment information to a UE through first high layer signaling, and transmit the other to the UE through second high layer signaling+a DL control channel.

When preferentially assigning transmission power to one of the first and second UL data channels, the transmission power may be preferentially assigned to an UL data channel corresponding to resource assignment information received through the first high layer signaling or to an UL data channel corresponding to the resource assignment information received through the second high layer signaling+the DL control channel.

According to the priority configuration method based on UL grant reception timings of the Embodiment 3, transmission power may be preferentially assigned to one of first and second UL data channels according to reception timings of first and second resource assignment information.

For example, the transmission power may be preferentially assigned to an UL data channel corresponding to resource assignment information having the most recent reception timing of the first and second resource assignment information. On the contrary, the transmission power may be preferentially assigned to an UL data channel corresponding to resource assignment information having the most late reception timing of the first and second resource assignment information.

According to the priority configuration method based on UL grant reception timings of the Embodiment 4, transmission power may be preferentially assigned to one of first and second UL data channels according to mapping types of the first and second UL data channels.

The transmission power may be preferentially assigned to one of the first and second UL data channels based on priority configuration information received through high layer signaling or a DL control channel.

The priority configuration information may indicate one of the following methods.

i) A method of preferentially assigning transmission power to an UL data channel with the shortest time duration or the longest time duration of time durations of first and second UL data channels (the time-duration based priority configuration method according to the Embodiment 1), ii) A method of preferentially assigning transmission power to an UL data channel corresponding to resource assignment information received through a first DL control channel or to an UL data channel corresponding to resource assignment information received through one of i) high layer signaling and ii) high layer signaling+a second DL control channel (the priority configuration method based on the presence or absence of an UL grant reception according to the Embodiment 2).

iii) A method of preferentially assigning transmission power to one of first and second UL data channels according to reception timings of first and second resource assignment information (the priority configuration method based on UL grant reception timings according to the Embodiment 3), iv) A method of preferentially assigning transmission power to one of first and second UL data channels according to mapping types of the first and second UL data channels (the mapping type based priority configuration method according to the Embodiment 4).

When preferentially assigning the transmission power to one of first and second UL data channels, when priority configuration information is not received, the transmission power may be preferentially assigned to one of the first and second UL data channels according to a predefined priority or a default priority.

Figure 17:
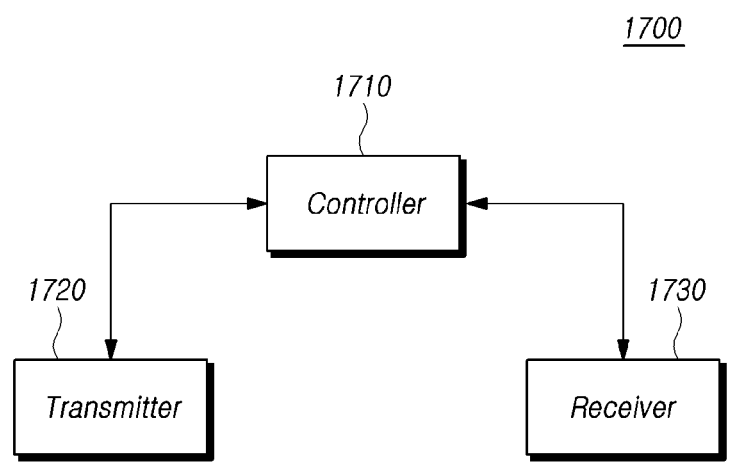
FIG. 17 is a block diagram illustrating a UE in accordance with embodiments of the present disclosure.

FIG. 17 is a block diagram illustrating a UE 1700 in accordance with embodiments of the present disclosure.

Referring to FIG. 17, a UE 1700 according to an embodiment includes a receiver 1710, a controller 1720, and a transmitter 1730.

The transmitter 1730 transmits UL control information, data, and messages through a corresponding channel to a base station. The transmitter 1730 may transmit UL data based on UL data resource allocation information.

The receiver 1710 receives DL control information, data, and messages through a corresponding channel from the base station.

The controller 1720 controls overall operations of the UE 1700 needed to perform methods of transmitting/receiving UL data channels in the NR according to the embodiments of the present disclosure described above.

The UE 1700 may a receiver 1710 receiving first resource assignment information on a first UL data channel and second resource assignment information on a second UL data channel from a base station, and a controller 1720 preferentially assigning transmission power to one of the first and second UL data channels and adjusting the transmission power for the other when the first and second UL data channels are needed to be transmitted by at least partially overlapping with each other in the time domain based on the first and second resource assignment information.

As adjusting the transmission power on the other, the controller 1720 may preferentially assign the transmission power to one of the first and second UL data channels. As a result, the controller 1720 may assign remaining transmission power to the other, or drop remaining UL data channel transmission(s) by controlling the transmission power to be zero.

When assigning the remaining transmission power to the other of the first and second UL data channels or dropping remaining UL data channel transmission(s) by controlling the transmission power to be zero, the controller 1720 may assign the remaining transmission power for only one or more symbol(s) on which the first and second UL data channels overlap in the time domain, for all symbols following the one or more overlapped symbol(s), or for all symbols, or control the transmission power to be zero and drop remaining UL data channel transmission(s).

Priority configuration methods may be priority configuration methods according to the Embodiment 1 to the Embodiment 4, for example, the time-duration based priority configuration method, the priority configuration method based on the presence or absence of an UL grant reception, the priority configuration method based on UL grant reception timings, or the priority configuration method based on mapping types.

According to the time-duration based priority configuration method of the Embodiment 1, when preferentially assigning transmission power to one of first and second UL data channels, the controller 1720 may assign the transmission power to an UL data channel with the shortest time duration or the longest time duration of time durations of the first and second UL data channels.

As shown in FIG. 11, when a first PUSCH transmission that is assigned on a slot basis and a second PUSCH transmission is assigned based on a non-slot of 2 symbols, priority may be given to the second PUSCH transmission with a shorter transmission time duration in the time domain. As a result, the first PUSCH transmission except for the second PUSCH may be dropped.

As shown in FIG. 11, when the first PUSCH transmission that is assigned on a slot basis and the second PUSCH transmission is assigned based on a non-slot of 2 symbols, a UE may preferentially assign PUSCH transmission power to the second PUSCH according to the Equation (1) or a new equation in case the new equation is defined for PUSCH transmission power. In case remaining transmission power is present, the UE may assign the remaining transmission power for the first PUSCH transmission.

According to the priority configuration method based on the presence or absence of an UL grant reception of the Embodiment 2, the receiver may receive one of the first and second resource assignment information from a base station through a first DL control channel and the other of the first and second resource assignment information from the base station through one of high layer signaling and high layer signaling+a second DL control channel.

When preferentially assigning transmission power to one of the first and second UL data channels, the controller 1720 may preferentially assign the transmission power to an UL data channel corresponding to resource assignment information received through the first DL control channel or to an UL data channel corresponding to the resource assignment information received through one of i) the high layer signaling and ii) the high layer signaling+the second DL control channel.

The receiver 1710 may receive one of first and second resource assignment information from a base station through first high layer signaling, and receive the other from the base station through second high layer signaling+a DL control channel.

When preferentially assigning transmission power to one of the first and second UL data channels, the controller 1720 may preferentially assign the transmission power to an UL data channel corresponding to resource assignment information received through the first high layer signaling or to an UL data channel corresponding to the resource assignment information received through the second high layer signaling+the DL control channel.

Referring to FIG. 12, when a collision occurs between a first PUSCH transmission based on an UL grant and a second PUSCH transmission based on a grant-free in one UE, the UE may give a priority to the second PUSCH transmission that is the grant-free based PUSCH transmission. As a result, the UE may drop the first PUSCH transmission except for the second PUSCH.

As shown in FIG. 12, when the UL grant based PUSCH transmission and the grant-free based PUSCH transmission are assigned, a UE may preferentially assign PUSCH transmission power to the second PUSCH based on the grant-free according to the Equation (1) or a new equation in case the new equation is defined for PUSCH transmission power, and in case remaining transmission power is present, may assign the remaining transmission power for the first PUSCH transmission based on the UL grant.

Additionally, when a collision occurs between configured grant based PUSCH transmissions, priority may be defined according to a corresponding configured grant type. For example, a type-1 configured grant based PUSCH transmission may have priority over a type-2 configured grant based PUSCH transmission, or the type-2 configured grant based PUSCH transmission may have priority over the type-1 configured grant based PUSCH transmission. The foregoing description may be substantially equally applied to specific PUSCH transmission methods according to this.

According to the priority configuration method based on UL grant reception timings of the Embodiment 3, when preferentially assigning transmission power to one of first and second UL data channels, the controller 1720 may preferentially assign the transmission power to one of the first and second UL data channels according to reception timings of first and second resource assignment information.

The controller 1720 may preferentially assign the transmission power to an UL data channel corresponding to resource assignment information having the most recent reception timing of the first and second resource assignment information.

Referring to FIG. 13, when a collision between a first PUSCH transmission and a second PUSCH transmission occurs in one UE, the UE may give a priority to the second PUSCH transmission that has received an UL grant for the corresponding PUSCH most recently, and as a result, drop the first PUSCH transmission except for the second PUSCH.

As shown in FIG. 13, a corresponding UE may assign PUSCH transmission power to the second PUSCH transmission that has received an UL grant for the corresponding PUSCH most recently according to the Equation (1) or a new equation in case the new equation is defined for PUSCH transmission power, and in case remaining transmission power is present, may assign the remaining transmission power for the first PUSCH transmission.

According to the mapping type based priority configuration of the Embodiment 4, when preferentially assigning transmission power to one of first and second UL data channels, the controller 1720 may preferentially assign the transmission power to one of the first and second UL data channels according to mapping types of the first and second UL data channels.

When preferentially assigning the transmission power to one of first and second UL data channels, the controller 1720 may preferentially assign the transmission power to one of the first and second UL data channels based on priority configuration information received through high layer signaling or a DL control channel.

The priority configuration information may indicate one of the following methods.

i) A method of preferentially assigning transmission power to an UL data channel with the shortest time duration or the longest time duration of time durations of first and second UL data channels (the time-duration based priority configuration method according to the Embodiment 1), ii) A method of preferentially assigning transmission power to an UL data channel corresponding to resource assignment information received through a first DL control channel or to an UL data channel corresponding to resource assignment information received through one of i) high layer signaling and ii) high layer signaling+a second DL control channel (the priority configuration method based on the presence or absence of an UL grant reception according to the Embodiment 2).

iii) A method of preferentially assigning transmission power to one of first and second UL data channels according to reception timings of first and second resource assignment information (the priority configuration method based on UL grant reception timings according to the Embodiment 3), iv) A method of preferentially assigning transmission power to one of first and second UL data channels according to mapping types of the first and second UL data channels (the mapping type based priority configuration method according to the Embodiment 4).

When preferentially assigning the transmission power to one of first and second UL data channels, when priority configuration information is not received, the controller 1720 may preferentially assign the transmission power to one of the first and second UL data channels according to a predefined priority or a default priority.

In accordance with embodiments of the present disclosure, it is possible efficiently to transmit UL data channels in various situations in which a plurality of UL data channel transmissions simultaneously occurs in one UE in the NR.

In accordance with embodiments of the present disclosure, when a plurality of PUSCH transmissions simultaneously occurs in one UE, the method of assigning PUSCH transmission power based on priorities and associated transmission operations of the UE have been described; however, the present disclosure is not limited thereto.

For example, when a plurality of UL transmissions simultaneously occurs in one UE, the present disclosure includes the method of assigning PUSCH transmission power based on priorities and associated transmission operations of the UE. For example, a plurality of UL transmissions may include a PUCCH and a PUSCH, the PUCCH and a PUCCH, the PUSCH and an SRS, or the PUCCH and the SRS.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of a user equipment (UE) for transmitting an uplink (UL) data channel, the method comprising:
    configuring a first physical uplink shared channel (PUSCH) with a first UL resource and a second PUSCH with a second UL resource;
    identifying that a transmission of the first PUSCH and a transmission of the second PUSCH are at least partially overlapped in a time domain based on the first UL resource and the second UL resource, the identified at least partially overlapped transmissions in the time domain including an overlapped area in the time domain corresponding to one or more symbols of the transmission of the first PUSCH and one or more symbols of the transmission of the second PUSCH; and
    based on the identification that the transmission of the first PUSCH and the transmission of the second PUSCH are at least partially overlapped in the time domain, performing the transmission of the second PUSCH configured with the second UL resource, and dropping the transmission of the first PUSCH configured with the first UL resource,
    wherein the transmission of the first PUSCH is dropped only for a duration of the one or more symbols of the first PUSCH that overlap with the one or more symbols of the second PUSCH by assigning a transmission power to the first PUSCH,
    wherein the transmission power is assigned as zero for the duration of the one or more symbols of the first PUSCH that overlap with the one or more symbols of the second PUSCH, and
    wherein the transmission power is normally assigned in a remaining duration that excludes the duration of the one or more symbols of the first PUSCH that overlap with the one or more symbols of the second PUSCH,
    the method further comprising:
    assigning first transmission power to the first PUSCH and second transmission power to the second PUSCH,
    wherein the second transmission power is preferentially assigned for the duration of the one or more symbols of the first PUSCH that overlap with the one or more symbols of the second PUSCH.

2. The method according to claim 1, wherein
    the first UL resource is received through a first downlink (DL) control channel, and
    the second UL resource is received through a higher layer signaling or through the higher layer signaling and a second DL control.

3. The method according to claim 1, wherein the first transmission power is assigned based on first priority configuration information received through a downlink (DL) control channel and the second transmission power is assigned based on second priority configuration information received through a higher layer signaling.

4. The method according to claim 3, wherein
    the first priority configuration information includes a first value for the first PUSCH and
    the second priority configuration information includes a second value for the second PUSCH.

5. The method according to claim 4, wherein the second value for the second PUSCH indicates a higher priority than the first value for the first PUSCH.

6. The method according to claim 1,
    wherein the dropped transmission of the first PUSCH corresponds to at least one specific symbol of the first PUSCH,
    wherein the at least one specific symbol of the first PUSCH corresponds to the one or more symbols of the first PUSCH that overlap with the one or more symbols of the second PUSCH, and
    wherein the first PUSCH is transmitted normally over remaining symbols that exclude the at least one specific symbol.

7. The method according to claim 1,
    wherein the transmission of the first PUSCH configured with the first UL resource is scheduled by a downlink control information (DCI), and
    wherein the first PUSCH and the second PUSCH are UL data channels carrying UL data.

8. A user equipment (UE) for transmitting an uplink (UL) data channel, the user equipment comprising:
    a controller configured to
        configure a first physical uplink shared channel (PUSCH) with a first UL resource and a second PUSCH with a second UL resource,
        identify a transmission of the first PUSCH and a transmission of the second PUSCH are at least partially overlapped in a time domain based on the first UL resource and the second UL resource, the identified at least partially overlapped transmissions in the time domain including an overlapped area in the time domain corresponding to one or more symbols of the transmission of the first PUSCH and one or more symbols of the transmission of the second PUSCH, drop the transmission of the first PUSCH configured with the first UL resource based on the identification that the transmission of the first PUSCH and the transmission of the second PUSCH are at least partially overlapped in the time domain, and assign a transmission power to the first PUSCH; and a transmitter configured to perform the transmission of the second PUSCH configured with the second UL resource based on the identification that the transmission of the first PUSCH and the transmission of the second PUSCH are at least partially overlapped in the time domain, wherein the transmission of the first PUSCH is dropped only for a duration of the one or more symbols of the first PUSCH that overlap with the one or more symbols of the second PUSCH, wherein the transmission power is assigned as zero for the duration of the one or more symbols of the first PUSCH that overlap with the one or more symbols of the second PUSCH, wherein the transmission power is normally assigned in a remaining duration that excludes the duration of the one or more symbols of the first PUSCH that overlap with the one or more symbols of the second PUSCH, wherein the controller assigns first transmission power to the first PUSCH and second transmission power to the second PUSCH, and wherein the second transmission power is preferentially assigned for the duration of the one or more symbols of the first PUSCH that overlap with the one or more symbols of the second PUSCH.

9. The UE according to claim 8, further comprising:
a receiver configured to
receive the first UL resource through a first downlink (DL) control channel, and
receive the second UL resource through a higher layer signaling or through the higher layer signaling and a second DL control.

10. The UE according to claim 8, wherein the first transmission power is assigned based on first priority configuration information received through a downlink (DL) control channel and the second transmission power is assigned based on second priority configuration information received through a higher layer signaling.

11. The UE according to claim 10, wherein the first priority configuration information includes a first value for the first PUSCH and the second priority configuration information includes a second value for the second PUSCH.

12. The UE according to claim 11, wherein the second value for the second PUSCH indicates a higher priority than the first value for the first PUSCH.

13. The UE according to claim 8,
wherein the dropped transmission of the first PUSCH corresponds to at least one specific symbol of the first PUSCH,
wherein the at least one specific symbol of the first PUSCH corresponds to the one or more symbols of the first PUSCH that overlap with the one or more symbols of the second PUSCH, and
wherein the first PUSCH is transmitted normally over remaining symbols that exclude the at least one specific symbol.

14. The UE according to claim 8,
wherein the transmission of the first PUSCH configured with the first UL resource is scheduled by a downlink control information (DCI), and
wherein the first PUSCH and the second PUSCH are UL data channels carrying UL data.

15. A method of a user equipment (UE) for transmitting an uplink (UL) data channel, the method comprising:
configuring a first physical uplink shared channel (PUSCH) with a first UL resource and a second PUSCH with a second UL resource;
identifying that a transmission of the first PUSCH and a transmission of the second PUSCH are at least partially overlapped in a time domain based on the first UL resource and the second UL resource, the identified at least partially overlapped transmissions in the time domain including an overlapped area in the time domain corresponding to one or more symbols of the transmission of the first PUSCH and one or more symbols of the transmission of the second PUSCH; and
based on the identification that the transmission of the first PUSCH and the transmission of the second PUSCH are at least partially overlapped in the time domain, performing the transmission of the second PUSCH configured with the second UL resource, and dropping the transmission of the first PUSCH configured with the first UL resource,
wherein the overlapped area in the time domain occurs immediately following a specific symbol of the first PUSCH,
wherein the first PUSCH is transmitted normally up to the specific symbol, and
wherein the dropped transmission of the first PUSCH continues from a symbol following the specific symbol to a last symbol of the first PUSCH.

16. The method according to claim 15, further comprising:
assigning first transmission power to the first PUSCH and second transmission power to the second PUSCH,
wherein the first transmission power is assigned as zero only for the symbols following the specific symbol at which the overlapped area is started and is normally assigned in a remaining duration.

17. The method according to claim 15,
wherein the transmission of the first PUSCH configured with the first UL resource is scheduled by a downlink control information (DCI), and
wherein the first PUSCH and the second PUSCH are UL data channels carrying UL data.

* * * * *